(12) United States Patent
Ganz

(10) Patent No.: US 8,225,462 B2
(45) Date of Patent: Jul. 24, 2012

(54) TEMPORARY SHEET SPLICE APPARATUS AND METHOD

(76) Inventor: Jonathan E. Ganz, Orangevale, CA (US)

( * ) Notice: Subject to any disclaimer, the term of this patent is extended or adjusted under 35 U.S.C. 154(b) by 271 days.

(21) Appl. No.: 12/803,802

(22) Filed: Jul. 7, 2010

(65) Prior Publication Data

US 2011/0005039 A1    Jan. 13, 2011

Related U.S. Application Data

(60) Provisional application No. 61/270,475, filed on Jul. 8, 2009.

(51) Int. Cl.
  *F16G 11/00*    (2006.01)
(52) U.S. Cl. .................... 24/115 R; 403/293
(58) Field of Classification Search ............. 24/122.6, 24/115 R; 403/293, 298, 314
  See application file for complete search history.

(56) References Cited

U.S. PATENT DOCUMENTS

| | | | | |
|---|---|---|---|---|
| 2,607,094 A | * | 8/1952 | Nicosia | 403/274 |
| 2,737,075 A | * | 3/1956 | Poirier et al. | 87/6 |
| 3,073,209 A | * | 1/1963 | Benk et al. | 87/6 |
| 3,136,844 A | * | 6/1964 | Petersen | 174/90 |
| 3,137,765 A | * | 6/1964 | Lanum | 174/90 |
| 4,236,281 A | * | 12/1980 | Bottum | 24/115 R |
| 4,321,854 A | * | 3/1982 | Foote et al. | 87/6 |
| 4,604,821 A | * | 8/1986 | Moser | 43/44.98 |
| 4,640,179 A | * | 2/1987 | Cameron | 87/6 |
| 4,777,784 A | * | 10/1988 | Ferguson | 54/34 |
| 4,939,831 A | * | 7/1990 | Doninger | 29/263 |
| 7,703,372 B1 | * | 4/2010 | Shakespeare | 87/6 |

* cited by examiner

*Primary Examiner* — Robert J Sandy
*Assistant Examiner* — Abigail E Morrell

(57) ABSTRACT

An apparatus for temporarily repairing a separated sheet of a sailing vessel, including a first inner sleeve being formed by a first pair of thin bands and having a plurality of teeth facing a first direction, a second inner sleeve being formed by a second pair of thin bands and having a plurality of teeth facing a second direction, and an outer sleeve bonded to the first and second inner sleeves, wherein the sleeves have the ability to expand when placed under a compression force in the lateral direction and contract when placed under a tension force in the lateral direction, thereby causing the teeth to bite into ends of the separated sheet when under tension.

5 Claims, 3 Drawing Sheets

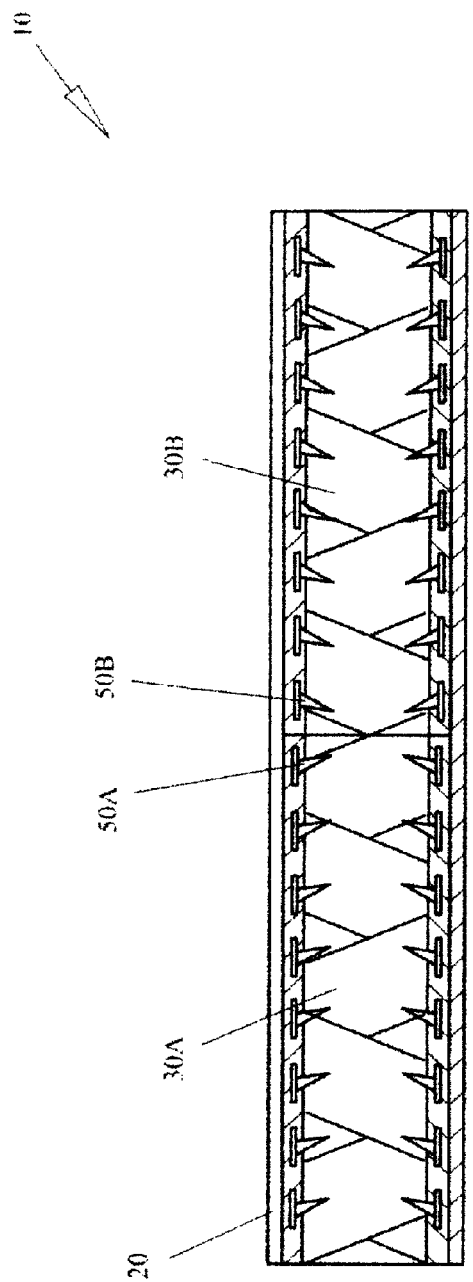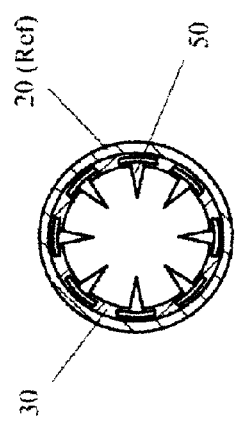
Fig. 2A
Fig. 2B

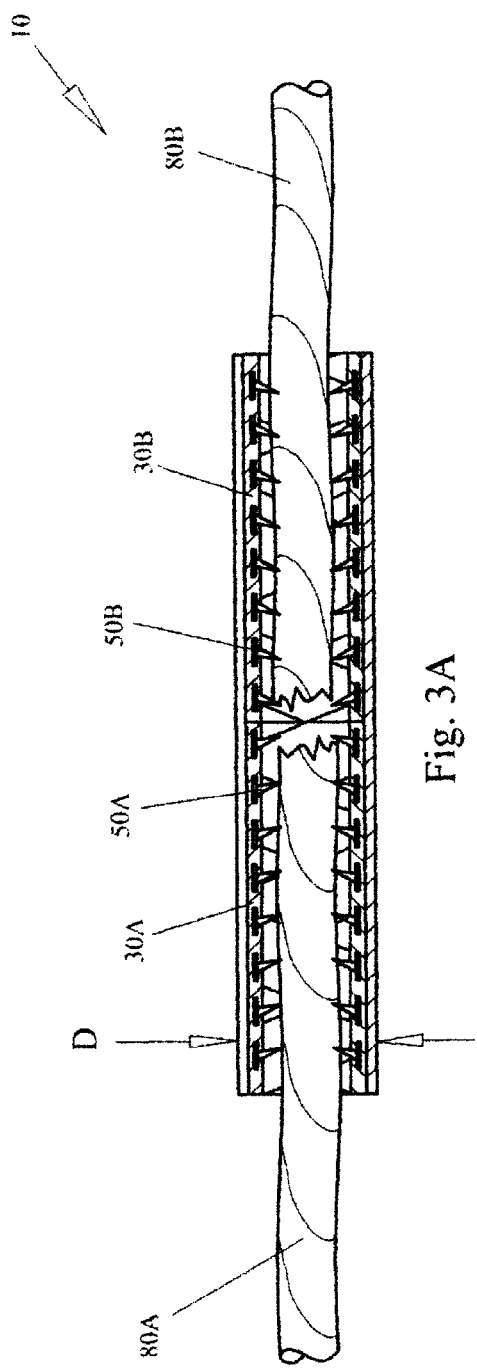
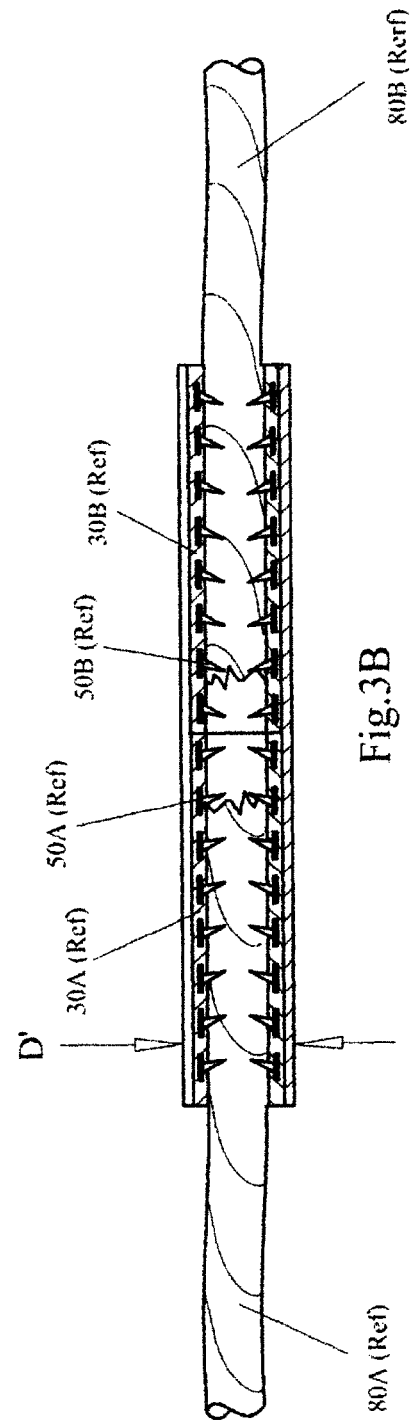
Fig. 3A
Fig. 3B

TEMPORARY SHEET SPLICE APPARATUS AND METHOD

This non-provisional utility patent application claims the benefit under 35 USC 119(e) of provisional application 61/270,475 filed Jul. 8, 2009.

BRIEF DESCRIPTION

The subject of this invention relates to sailing vessels. Specifically, the disclosed invention presents an apparatus and method for making emergency repairs to a separated sheet while under sail. The disclosed invention thus permits the vessel with a separated sheet to return to port with no outside assistance.

BACKGROUND OF THE INVENTION

Sailing vessels have existed for centuries. While modern sailing vessels have taken advantage of the technological progress made in materials and methods science, the fundamental operation of a sailing vessel remains the same. That is, depending on wind conditions and direction, a sail or sails must be raised, lowered, or trimmed to optimize the performance of the craft.

Modernly, as in historical times, sails are raised and lowered via a system of sheets running through pulleys or sheaves. For clarity, a pulley is a stand-alone device comprised of a housing and a sheave. The sheave is the grooved wheel that a sheet, or halyard passes across during sail raising or lowering operations. Again, for clarity, a sheet or halyard is effectively a length of rope. These halyards or sheets are referred to generally as running rigging and must be adjusted constantly to optimize operation of the vessel.

Because the running rigging is under constant strain and must be adjusted on a regular basis, wear occurs. There are numerous sources of the wear including moisture, strain from sail loading, flexing due to winching, and chaffing against stationary objects such as stays or life lines, referred to as standing rigging. The standing rigging is used to support the mast or masts and yards or spreaders. By far the worst culprit for sheet wear is chaffing. Objects such as stays or life lines are generally made from steel cable. Small protrusions, or hairs, cover the surface, so as the sheet comes in contact with standing rigging an abrading occurs which will cause an eventual separation of the sheet.

If the wear to a component of the running rigging is discovered while in port, it can be repaired prior to getting the vessel under way. But many times a sheet that appears to be in good working order at the dock will fail while the vessel in under way, far from the safety of a mooring place or dock. When this occurs the ability of the vessel to operate safely is compromised, so the separated sheet must be repaired while away from the dock.

Several methods for repairing running rigging while under way are known and in use. Historically, the splice method has been used. There are two general types of splices: the short splice and the long splice. The short splice is easiest to implement, but has the significant disadvantage of not being able to pass over a sheave due to the narrow opening of the pulley housing. If the particular sheet can be used without passing through a pulley, then this method will work adequately.

However, the vast majority of the sheet separations involve a line that must pass through a pulley. The long splice may allow such passage if the sheave is wide enough, but the long splice has the significant disadvantage of being very difficult to implement. Moreover, it takes a long time and in many cases the repair must be made in a very short period. For example, if the vessel is unable to maintain forward motion, or make way, the vessel simply drifts at the behest of the wind and current. Absent control, it is clear that the vessel can run afoul of other craft in the area or worse, run aground on the shore.

What would be desirable would be an apparatus and method that would allow a separated sheet to be repaired in a very short period of time yet allow the repaired sheet to pass through a pulley.

SUMMARY OF THE INVENTION

The apparatus and method of the present invention provide an ability to repair a separated sheet in a very short period of time. Moreover, the apparatus of the present invention may be applied to a wide range of sheet diameters. A sleeve is provided that has opposed teeth internally. The ends of the separated sheet are placed in opposite ends of the sleeve and, when tension is applied, the sleeve contracts, causing the opposing teeth to bite into the ends of the sheet. Due to the contraction of the sleeve, the repaired sheet is capable of passing over a sheave in the normal fashion.

The apparatus of the present invention is constructed from two concentric sleeves. The inner sleeve has two sets of teeth disposed around the inner diameter of the inner sleeve. The teeth on the first end point inward toward the center of the inner sleeve. The teeth on the second, opposite end of the inner sleeve also point inward. Thus when the end of a separated sheet is pushed into the end of the inner sleeve, it moves with ease past the teeth because the teeth are pointing away from the direction of travel. However, if the end of the separated sheet is pulled in an attempt to remove it from the end of the inner sleeve, it stops because it is pulling against the direction of the teeth.

The inner sleeve is made of interwoven bands similar to a simple basket weave. As such it exhibits an ability to expand when the opposite ends are compressed towards each other and, conversely, to contract when the opposite ends are pulled away from each other. The concept is akin to the classic Chinese finger cuff Thus when each of the ends of a separated sheet are pushed into the opposite ends of the apparatus of the present invention, they tend to meet in the center of sleeve. When tension is applied to the sheet, the sleeve contracts, causing the teeth to bite into both of the ends of the separated sheet thereby forming a splice capable of transiting the opening of a sheave and restoring operation of the sheet.

The outer sleeve is made of a smooth thin wall plastic. This material is used to both protect the inner sleeve and to provide a smooth transition between the separated sheet and the splice so that the repaired sheet passes easily over the sheave and through the pulley housing.

The present invention is discussed in detail below in conjunction with the drawings listed below. As will be evident, the apparatus and method of the present invention overcomes the disadvantages of the prior art.

BRIEF DESCRIPTION OF THE DRAWINGS

FIG. 2: is a sectional view of the apparatus of the present invention.

FIG. 3: is a sectional view of the apparatus of the present invention showing operational details.

DETAILED DESCRIPTION OF PREFERRED EMBODIMENTS

Figure 1:
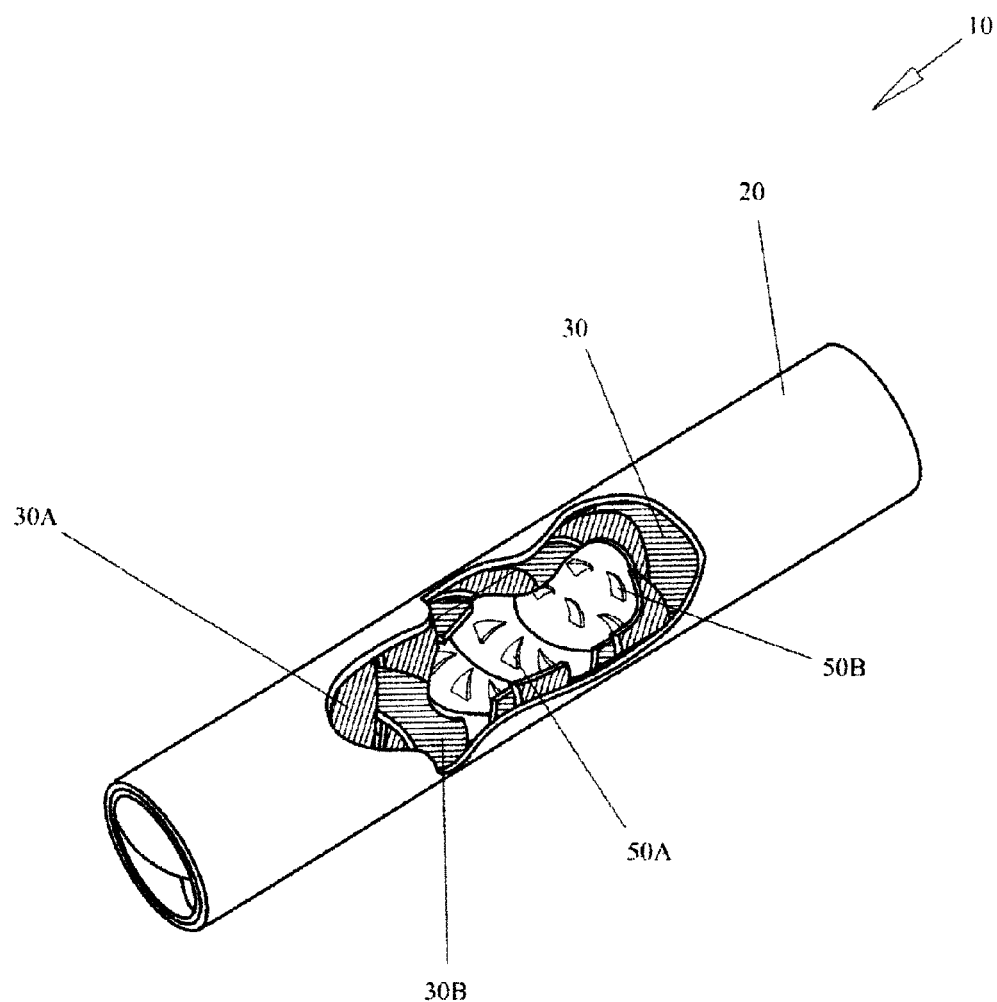
FIG. 1: is an isometric view of the apparatus of the present invention.

As described briefly above, the apparatus of the present invention operates on the concept of expansion and contraction. FIG. 1 shows a sectioned isometric view of the apparatus 10. An outer sleeve 20 covers an inner sleeve 30. Both sleeves are made of flexible material, as described in detail below, and are capable of being compressed along the long axis such that under compression, that is when one end of the apparatus is pushed towards the opposite end, the diameter of the sleeves increases. In a corresponding manner, when under tension, that is when one end of the apparatus is pulled away from the opposite end, the diameter of the sleeves decreases.

Continuing with FIG. 1, the inner sleeve 30 is made up of two bands 30A and 30B woven in a simple basket weave wherein a first band passes first over, then under a second band. The resulting checkerboard pattern produces the ability to compress and/or tense since the two bands are free to move about each other to a limited extent. Disposed on the inner surface of the inner sleeve 30 are two sets of teeth. A first set of teeth 50A is oriented inward from a first end of the inner sleeve 30 towards the center of the apparatus. A second set of teeth 50B is oriented inward from a second end of the inner sleeve 30 towards the center of the apparatus. These sets of teeth are fixably bonded to the inner surface of inner sleeve 30 and are disposed radially in several rows. In an exemplary embodiment there are ten sets of teeth oriented in each orientation.

Still referring to FIG. 1, the outer sleeve 20 is a smooth material thinner in its thickness than inner sleeve 30. The outer sleeve 20 serves two purposes: first, to protect the inner sleeve and second, to provide a surface capable of transiting a sheave without interfering with the pulley housing. Protection of the inner sleeve 30 is required since the weave pattern results in a contoured surface. Since each of the bands that form the inner sleeve has a thickness, when they pass over or under each other a bump is formed. If this bump were to be passed over a sheave multiple times damage may occur. Adding the outer sleeve 20 smoothes these bumps and protects the inner sleeve 30.

One benefit of the construction of the present invention is that it may be used with a variety of sheet types. While most contemporary sheets are made from nylon line or nylon derivatives such as Dacron® due to their inherent resistance to salt and weather, there are still other sheet materials in use. For example, hemp and cotton sheets still exist and the present inventions able to perform adequately with materials.

Turning to FIG. 2, two sectioned views of the apparatus 10 are shown. FIG. 2A is sectioned along the long axis at the centerline. The outer sleeve 20 is a continuous thin wall sleeve. In a preferred embodiment, the outer sleeve 20 is made of flexible plastic, for example reinforced PVC [polyvinylchloride] tubing such as Urebrade® from U.S. Plastic Corporation, Lima, Ohio. As noted above, the purpose of this outer sleeve is to protect the inner sleeves 30A and 30B from wear as a result of transiting a sheave.

Inner sleeve 30 from FIG. 1 is actually composed of two separate sleeves, 30A and 30B. This is necessary in order to provide teeth that are opposite in direction as discussed below. Inner sleeves 30A and 30B in a preferred embodiment are formed of bands woven in a simple under/over pattern. Using this pattern allows the apparatus of the present invention to compress and expand along the longitudinal axis to a limited extent. Those of skill in the art will recognize that the simple under/over pattern is not the only possible weave, thus the use of this pattern is exemplary only and should not be read as a limitation on the scope of the invention. Additionally, it would be possible to use other processes to form the inner sleeves without departing from the spirit of the invention, for example, an extrusion process.

The individual bands comprising inner sleeves 30A and 30B of FIG. 2 in a preferred embodiment are made from fiber reinforced rubber, for example, 0.062 inch vinyl-PVC reinforced rubber bands from RS Rubber Corporation, Wallington, N.J. Each of the inner sleeves is constructed with a set of teeth molded into the band material in such a way that when the bands are interwoven to form a sleeve, the teeth form a circular pattern such as that shown in FIG. 2B. Each of the teeth 50 of inner sleeve 30 are made from stainless steel in a preferred embodiment and each of the teeth has approximately 0.125 inches of tooth exposed above the inner surface of the band forming the sleeve. This material is used in order to prevent deterioration due to salt water exposure. However, it will be recognized that other materials could be used without departing from the spirit of the invention, for example, plastic or aluminum. The only limitation for the construction of the inner sleeves is that the sleeves demonstrate the ability to expand and contract to a degree in order to allow the present invention to operate.

Returning to FIG. 2A, the counter-opposed orientation of teeth 50A associated with inner sleeve 30A and teeth 50B associated with inner sleeve 30B can be clearly seen. Inner sleeves 30A and 30B are inserted into outer sleeve 20 from opposite, butting against each other in the approximate middle of the assembled apparatus. As described above, the outer sleeve 20 accomplishes two main goals: first, it protects the inner sleeves from damage due to wear when running through a sheave, and second, it smoothes out the bumps formed as a result of the weave pattern, thereby making the passing of the repaired sheet through the sheave much easier.

FIG. 3 provides the details of the operation of the present invention. FIG. 3A shows a longitudinal cross section of the apparatus at a. point in time when the ends of the damaged sheet have been inserted into the inner sleeves. As shown, sheet end 80A has been inserted into inner sleeve 30A, travelling in the direction of the teeth 50A. Since the sheet end 80A is travelling in the direction of teeth 50A, the sheet end passes easily. In a like manner sheet end 80B has been inserted into inner sleeve 30B. Both ends of the damaged sheet meet in the approximate middle of the apparatus, although this is not critical to the operation of the invention. At this point in time, and due in part to the force of inserting sheet ends 80A and 80B, the apparatus is placed in the compression mode, causing the diameter D to increase slightly, thereby allowing the damaged sheet ends to more easily enter the inner sleeves.

In FIG. 3B a tension force has been applied to the damaged sheet ends 80A and 80B. As this force is applied, teeth 50A and 50B tend to impale the damaged sheet ends. The direct result is that the diameter of the apparatus reduces to D'. As the tension force increases, the apparatus tends to take the shape of the sheet ends, forming a splice that will pass through a sheave without interference.

In operation, the combination of the sleeve-and-tooth configuration provides a rapid temporary repair of a separated sheet. By way of explanation, consider that a vessel is under way and the jib sheet separates. Note that a jib is a type of sail very often used on contemporary sailing vessels. The first action of the operator would be to head the vessel into the wind to take the load off the jib. This will allow the operator to safely gain control over both ends of the separated sheet.

Once both ends have been controlled, the operator will compress the apparatus of the present invention by pushing a first end towards the opposite end, then insert one end of the separated sheet into a first end of the apparatus, insuring that the sheet end is well inside the inner sleeve. This must be done to insure that the teeth will engage when tension is applied to the apparatus. At this point, and while the apparatus of the present invention is still under some compression, the second end of the separated sheet is inserted into the opposite end of the apparatus in the same manner and with the same assurances as the first end.

Once both ends of the separated sheet have been inserted into the compressed apparatus, tension is applied to both ends of the separated sheet. In so doing, the two sets of opposed teeth within the inner sleeve will dig into the ends of the separated sheet. Further tension will cause the teeth to embed further and eventually to place tension on the ends of the apparatus, causing its diameter to decrease and trapping the separated sheet inside. At this point the sheet has been temporarily repaired and the vessel may resume course until proper replacement of the sheet can occur.

Since sheets used with contemporary sailing vessels are of varying sizes, and since it would be difficult to provide a one-size-fits-all apparatus, the present invention has a range of sizes. The smallest diameter in a preferred embodiment is 0.25 inch, while the largest is 0.625 inch. It will be recognized by those of skill in the art that other larger or smaller sizes could be provided without departing from the spirit of the invention, thus the sizes provided by the preferred embodiment are exemplary in nature.

One advantage of the present invention is that it provides an easy, fast repair to a separated sheet while a vessel is under way. This ability is critically important if the vessel could be placed in danger due to conditions at the time of the break.

A second advantage of the present invention is that the repair may be completed by a single person aboard. This means that if a person is operating a vessel solo, and if a sheet break occurs, the vessel may be placed in a neutral condition and the repair made. This is possible due to the rapidity with which a broken sheet may be repaired.

A third advantage of the present invention is that the apparatus may be used with a variety of sheet types. The apparatus of the present invention is suitable for use with nylon, cotton or hemp sheet without modification or deterioration in performance.

A fourth advantage of the present invention is that it is economical. Since the apparatus may be used with a variety of material and diameters, only one such device is required to accommodate a range of sheet types and sizes.

What is claimed is:

1. An apparatus for temporarily repairing a separated sheet of a sailing vessel comprising:
   a first inner sleeve, said first inner sleeve being formed by a first pair of thin bands such that said first inner sleeve expands when placed under a compression force in the lateral direction and contracts when placed under a tension force in the lateral direction, said first pair of bands of said first inner sleeve having a first plurality of teeth permanently embedded within said first pair of bands, said first plurality of teeth facing in a first direction such that when said first pair of bands are woven into the shape of said first inner sleeve said first plurality of teeth are disposed around the entire inner surface of said first inner sleeve;
   a second inner sleeve, said second inner sleeve being formed by a second pair of thin bands such that said second inner sleeve expands when placed under a compression force in the lateral direction and contracts when placed under a tension force in the lateral direction, said second pair of bands of said second inner sleeve having a second plurality of teeth permanently embedded within said second pair of bands, said second plurality of teeth facing in a second direction such that when said second pair of bands are woven into the shape of said second inner sleeve said second plurality of teeth are disposed around the entire inner surface of said second inner sleeve, and;
   an outer sleeve wherein said first inner sleeve is inserted into a first end of said outer sleeve and said second inner sleeve is inserted into the opposite end of said outer sleeve such that said first plurality of teeth in said first inner sleeve and said second plurality of teeth in said second inner sleeve face toward the center of said outer sleeve, the outer surface of said first inner sleeve and the outer surface of said second inner sleeve being permanently bonded to the inner surface of said outer sleeve, said outer sleeve having as one characteristic the ability to stretch such that said outer sleeve conforms to the shape of said first inner sleeve and said second inner sleeve when said first inner sleeve and said second inner sleeve are placed under lateral force.

2. The apparatus of claim 1 wherein said outer sleeve is made from reinforced polyvinylchloride having a wall thickness of approximately 0.062 inches and a length of approximately four inches.

3. The apparatus of claim 1 wherein said first and second inner sleeves are made from vinyl-PVC reinforced rubber with a thickness of approximately 0.062 inches and a width of approximately 0.50 inches.

4. The apparatus of claim 1 wherein said plurality of teeth are made from stainless steel having an exposed length of approximately 0.125 inches and a thickness of approximately 0.046 inches.

5. The apparatus of claim 1 wherein the assembled inner diameter of said assembled apparatus has a range of from 0.25 inches to 0.625 inches.

* * * * *